(12) United States Patent
Kamiya et al.

(10) Patent No.: US 12,227,603 B2
(45) Date of Patent: Feb. 18, 2025

(54) COMPRESSED MEMBER FOR ELECTROCHEMICAL DEVICE

(71) Applicant: DAIKIN INDUSTRIES, LTD., Osaka (JP)

(72) Inventors: Yusuke Kamiya, Osaka (JP); Takahiro Furutani, Osaka (JP); Kouhei Takemura, Osaka (JP); Riku Yamaguchi, Osaka (JP); Keisuke Shiomi, Osaka (JP); Masaki Irie, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 587 days.

(21) Appl. No.: 17/596,480

(22) PCT Filed: Jun. 15, 2020

(86) PCT No.: PCT/JP2020/023415
§ 371 (c)(1),
(2) Date: Dec. 10, 2021

(87) PCT Pub. No.: WO2020/251055
PCT Pub. Date: Dec. 17, 2020

(65) Prior Publication Data
US 2022/0306781 A1 Sep. 29, 2022

(30) Foreign Application Priority Data
Jun. 14, 2019 (JP) .................................. 2019-111151

(51) Int. Cl.
| | |
|---|---|
| H01M 50/193 | (2021.01) |
| C08F 214/22 | (2006.01) |
| C08F 214/26 | (2006.01) |
| C08K 5/14 | (2006.01) |
| C08L 27/16 | (2006.01) |
| C08L 27/18 | (2006.01) |

(52) U.S. Cl.
CPC ...... *C08F 214/222* (2013.01); *C08F 214/262* (2013.01); *C08K 5/14* (2013.01); *C08L 27/16* (2013.01); *C08L 27/18* (2013.01); *H01M 50/193* (2021.01); *C08L 2312/02* (2013.01)

(58) Field of Classification Search
None
See application file for complete search history.

(56) References Cited

U.S. PATENT DOCUMENTS

| | | | |
|---|---|---|---|
| 4,745,165 A | 5/1988 | Arcella et al. | |
| 5,585,449 A * | 12/1996 | Arcella ................ | C08K 5/0025 526/252 |
| 2010/0233580 A1 | 9/2010 | Kashihara | |
| 2011/0166296 A1 | 7/2011 | Murai et al. | |
| 2016/0006004 A1 | 1/2016 | Ogawa et al. | |

FOREIGN PATENT DOCUMENTS

| | | | | |
|---|---|---|---|---|
| CN | 103131106 A | 6/2013 | | |
| EP | 2264100 A1 * | 12/2010 | ............ | C08F 259/08 |
| EP | 3 460 897 A1 | 3/2019 | | |
| JP | 62-36407 A | 2/1987 | | |
| JP | 8-12726 A | 1/1996 | | |
| JP | 11-80271 A | 3/1999 | | |
| JP | 2005-350490 A | 12/2005 | | |
| JP | 2008-7671 A | 1/2008 | | |
| JP | 2008-235081 A | 10/2008 | | |
| JP | 2008-303321 A | 12/2008 | | |
| JP | 2009-117063 A | 5/2009 | | |
| JP | 2009-252719 A | 10/2009 | | |
| JP | 2010-70632 A | 4/2010 | | |
| JP | 2011-29167 A | 2/2011 | | |
| JP | 2013-139586 A | 7/2013 | | |
| JP | 2014-56675 A | 3/2014 | | |

(Continued)

OTHER PUBLICATIONS

Ichisaka, T, et al., "Graft fluoropolymers with good mechanical properties, melt moldability, and flexibility, their manufacture, and crosslinkable compositions", Chemical Abstracts Service, Columbus, Ohio, US, Oct. 8, 2009 (5 pages) XP002808810.

Extended European Search Report dated May 15, 2023 in Application No. 20823135.7.

International Search Report dated Sep. 1, 2020 in International Application No. PCT/JP2020/023415.

International Preliminary Report on Patentability with a translation of Written Opinion dated Dec. 14, 2021 from the International Bureau in corresponding International Application No. PCT/JP2020/023415.

*Primary Examiner* — Richard A. Huhn
(74) *Attorney, Agent, or Firm* — Sughrue Mion, PLLC

(57) ABSTRACT

A member to be compressed for an electrochemical device obtained by crosslinking a crosslinkable composition containing a fluorine-containing elastomer containing a unit based on at least one crosslinkable group-containing monomer selected from the group consisting of a crosslinkable group-containing monomer (1) represented by the general formula (1):

$$CX^1_2\!=\!CF\!-\!Rf^1\!-\!X^2$$

wherein each $X^1$ independently represents H or F, and $Rf^1$ represents a fluorinated alkylene group or a fluorinated oxyalkylene group, and $X^2$ represents I or Br; and a crosslinkable group-containing monomer (2) represented by the general formula (2):

$$CX^3_2\!=\!CX^3\!-\!Z^1\!-\!CX^3\!=\!CX^3_2$$

wherein each $X^3$ independently represents H, F, an alkyl group or a fluorinated alkyl group, and $Z^1$ represents an alkylene group, a fluorinated alkylene group, a cycloalkylene group, a fluorinated cycloalkylene group, an oxyalkylene group or a fluorinated oxyalkylene group.

7 Claims, No Drawings

(56) References Cited

FOREIGN PATENT DOCUMENTS

| | | |
|---|---|---|
| JP | 2016-4668 A | 1/2016 |
| WO | 2009/119409 A1 | 10/2009 |
| WO | 2014/103813 A1 | 7/2014 |
| WO | 2014/129413 A1 | 8/2014 |
| WO | 2018/089256 A1 | 5/2018 |
| WO | 2018/213671 A1 | 11/2018 |

\* cited by examiner

COMPRESSED MEMBER FOR ELECTROCHEMICAL DEVICE

CROSS REFERENCE TO RELATED APPLICATIONS

This application is a National Stage of International Application No. PCT/JP2020/023415 filed Jun. 15, 2020, claiming priority based on Japanese Patent Application No. 2019-111151 filed Jun. 14, 2019.

TECHNICAL FIELD

The present disclosure relates to a member to be compressed for an electrochemical device.

BACKGROUND ART

Patent Document 1 describes a sealed battery comprising: a battery case with a through hole; a gasket having a through hole and fitted so as to face the battery case; and a rivet provided so as to penetrate through the through hole of the battery case and the through hole of the gasket from the inside of the battery case. This gasket can be an elastic member, having insulating properties, made of a fluoroelastomer (such as a tetrafluoroethylene-perfluoroalkyl vinyl ether copolymer (PFA), a vinylidene fluoride-based polymer (FKM), and a tetrafluoroethylene-propylene-based copolymer (FEPM)), an ethylene-propylene rubber (EPM), an ethylene-propylene-diene copolymer rubber (EPDM), or a butyl rubber or the like.

RELATED ART

Patent Documents

Patent Document 1: Japanese Patent Laid-Open No. 2016-4668

SUMMARY OF THE INVENTION

Problem to be Solved by the Invention

An object of the present disclosure is to provide a member to be compressed for an electrochemical device that is excellent in compression set resistance and electrolyte resistance and also exhibits good releasability at the time of molding.

Means for Solving the Problem

The present disclosure provides a member to be compressed for an electrochemical device obtained by crosslinking a crosslinkable composition containing a fluorine-containing elastomer containing a unit based on at least one crosslinkable group-containing monomer selected from the group consisting of a crosslinkable group-containing monomer (1) represented by the general formula (1):

$$CX^1_2=CF-Rf^1-X^2$$

wherein each $X^1$ independently represents H or F, $Rf^1$ represents a fluorinated alkylene group or a fluorinated oxyalkylene group, and $X^2$ represents I or Br; and each group has optionally an oxygen atom between two carbon atoms when each group has two or more carbon atoms, and each group has optionally an aromatic ring, and each group is linear or branched; and a crosslinkable group-containing monomer (2) represented by the general formula (2):

$$CX^3_2=CX^3-Z^1-CX^3=CX^3_2$$

wherein each $X^3$ independently represents H, F, an alkyl group or a fluorinated alkyl group, and $Z^1$ represents an alkylene group, a fluorinated alkylene group, a cycloalkylene group, a fluorinated cycloalkylene group, an oxyalkylene group or a fluorinated oxyalkylene group; and each group has optionally an oxygen atom between two carbon atoms when each group has two or more carbon atoms, and each group optionally an aromatic ring, and each group is linear or branched.

The crosslinkable group-containing monomer (1) is preferably a crosslinkable group-containing monomer represented by the general formula (3):

$$CF_2=CF(OCF_2CF(CF_3))_n(OCF_2CF_2CH_2)_mI$$

wherein n represents an integer of 0 to 3 and m represents an integer of 1 to 5.

The crosslinkable group-containing monomer (2) is preferably a crosslinkable group-containing monomer represented by the general formula (4):

$$CH_2=CH-(CF_2)_k-CH=CH_2$$

wherein k represents an integer of 2 to 8.

Preferably, the fluorine-containing elastomer further contains a tetrafluoroethylene unit, and the content of tetrafluoroethylene unit in the fluorine-containing elastomer is 15 to 60 mol % based on the total monomer units.

Preferably, the fluorine-containing elastomer further contains vinylidene fluoride unit, and the content of vinylidene fluoride unit in the fluorine-containing elastomer is 35 to 70 mol % based on the total monomer units.

The crosslinkable composition preferably further contains a fluorine-containing elastomer that does not contain any unit based on the crosslinkable group-containing monomer.

The crosslinkable composition preferably further contains a peroxide cross-linking agent.

The member to be compressed for an electrochemical device of the present disclosure can be suitably used as a member to be compressed for a non-aqueous electrolyte secondary battery.

The member to be compressed for an electrochemical device of the present disclosure can be suitably used as a sealing member or an insulating member.

Effect of Invention

The present disclosure can provide a member to be compressed for an electrochemical device that is excellent in compression set resistance and electrolyte resistance and also exhibits good releasability at the time of molding.

DESCRIPTION OF EMBODIMENTS

Hereinafter, the present disclosure will be described in detail with respect to specific embodiments, but the present disclosure is not limited to the following embodiments.

The member to be compressed for an electrochemical device of the present disclosure is a member used by compressing to deform it. The present inventors have found that the member to be compressed formed from a fluorine-containing elastomer containing a unit based on a specific crosslinkable group-containing monomer is excellent in compression set resistance and electrolyte resistance and also exhibits good releasability at the time of molding, and is thereby suitable as a member to be compressed used in an electrochemical device, and have completed the member to be compressed for an electrochemical device of the present disclosure. As used in the present disclosure, the expression "excellent in compression set resistance" means that the compression set (%) of the member to be compressed for an electrochemical device is small.

The member to be compressed for an electrochemical device of the present disclosure is obtained by crosslinking a crosslinkable composition containing a fluorine-containing elastomer, wherein the fluorine-containing elastomer contains a unit based on at least one crosslinkable group-containing monomer selected from the group consisting of a crosslinkable group-containing monomer (1) and a crosslinkable group-containing monomer (2) (in the present disclosure, sometimes referred to as simply "crosslinkable group-containing monomer unit").

The fluorine-containing elastomer to be used in the present disclosure is an amorphous fluoropolymer. The term "amorphous" means that the fluoropolymer has a melting peak ($\Delta H$) of 4.5 J/g or less as measured in differential scanning calorimetry [DSC] (at a heating rate of 10° C./min) or differential thermal analysis [DTA] (at a heating rate of 10° C./min). The fluorine-containing elastomer, when crosslinked, exhibits elastomeric properties. The term "elastomeric properties" refers to the properties that the polymer can be stretched and retain its original length when the forces required to stretch the polymer are no longer applied.

The crosslinkable group-containing monomer (1) is represented by the general formula (1):

$$CX^1_2=CF-Rf^1-X^2$$

wherein each $X^1$ independently represents H or F, $Rf^1$ represents a fluorinated alkylene group or a fluorinated oxyalkylene group, and $X^2$ represents I or Br.

In the formula (1), each $X^1$ is independently H or F. $X^1$ is preferably F, because the member to be compressed for an electrochemical device is much better in compression set resistance, electrolyte resistance and also releasability at the time of molding.

$Rf^1$ is a fluorinated alkylene group or a fluorinated oxyalkylene group. When the fluorinated alkylene group or fluorinated oxyalkylene group has two or more carbon atoms, it has optionally an oxygen atom between two carbon atoms. The fluorinated alkylene group or fluorinated oxyalkylene group also has optionally an aromatic ring. The fluorinated alkylene group or fluorinated oxyalkylene group may be linear or branched as long as a part or all of H bonded to the carbon atom is replaced by F.

$Rf^1$ preferably has 1 to 40 carbon atoms, more preferably 1 to 30, still more preferably 2 to 24, particularly preferably 3 to 12, and most preferably 3 to 9 carbon atoms.

$Rf^1$ is preferably a fluorinated oxyalkylene group, and more preferably a fluorinated oxyalkylene group represented by $-(ORf^2)_p-$ wherein $Rf^2$ represents a linear or branched alkylene group having 1 to 4 carbon atoms, and p represents an integer of 1 to 10.

Examples of the crosslinkable group-containing monomer (1) include a monomer represented by the following general formula, and these monomers can be used singly or in combination:

$$CX^1_2=CF-Rf^3-CHR^1-X^2$$

wherein $X^1$ and $X^2$ are as described above, $Rf^3$ represents a fluorinated alkylene group or a fluorinated oxyalkylene group, and $R^1$ represents H or $CH_3$;

$$CX^1_2=CF-(CF_2)_n-X^2$$

wherein $X^1$ and $X^2$ are as described above, and n represents an integer of 1 to 8;

$$CX^1_2=CF-CF_2Rf^4-X^2$$

wherein $X^1$ and $X^2$ are as described above, $Rf^4$ represents $-(OCF_2)_n-$ or $-(OCF(CF_3))_n-$, and n represents an integer of 0 to 5;

$$CF_2=CFCF_2(OCF(CF_3)CF_2)_m(OCH_2CF_2CF_2)_n OCH_2CF_2-X^2$$

wherein $X^2$ is as described above, m represents an integer of 0 to 5, and n represents an integer of 0 to 5;

$$CF_2=CFCF_2(OCH_2CF_2CF_2)_m(OCF(CF_3)CF_2)_n OCF(CF_3)-X^2$$

wherein $X^2$ is as described above, m represents an integer of 0 to 5, and n represents an integer of 0 to 5;

$$CF_2=CF(OCF_2CF(CF_3))_m O(CF_2)_n-X^2$$

wherein $X^2$ is as described above, m represents an integer of 0 to 5, and n represents an integer of 1 to 8;

$$CF_2=CF(OCF_2CF(CF_3))_m-X^2$$

wherein $X^2$ is as described above, and m represents an integer of 1 to 5;

$$CF_2=CFOCF_2(CF(CF_3)OCF_2)_n CF(-X^2)CF_3$$

wherein $X^2$ is as described above, and n represents an integer of 1 to 4;

$$CF_2=CFO(CF_2)_n OCF(CF_3)-X^2$$

wherein $X^2$ is as described above, and n represents an integer of 2 to 5;

$$CF_2=CFO(CF_2)_n-(C_6H_4)-X^2$$

wherein $X^2$ is as described above, and n represents an integer of 1 to 6;

$$CF_2=CF(OCF_2CF(CF_3))_n OCF_2CF(CF_3)-X^2$$

wherein $X^2$ is as described above, and n represents an integer of 1 to 2;

$$CH_2=CFCF_2O(CF(CF_3)CF_2O)_n CF(CF_3)-X^2$$

wherein $X^2$ is as described above, and n represents an integer of 0 to 5;

$$CF_2=CFO(CF_2CF(CF_3)O)_m(CF_2)_n-X^2$$

wherein $X^2$ is as described above, m represents an integer of 0 to 5, and n represents an integer of 1 to 3;

$$CH_2=CFCF_2OCF(CF_3)OCF(CF_3)-X^2$$

wherein $X^2$ is as described above;

$$CH_2=CFCF_2OCH_2CF_2-X^2$$

wherein $X^2$ is as described above;

$$CF_2=CFO(CF_2CF(CF_3)O)CF_2CF(CF_3)-X^2$$

wherein $X^2$ is as described above, and m represents an integer of 0 or more;

$$CF_2=CFOCF(CF_3)CF_2O(CF_2)_n-X^2$$

wherein $X^2$ is as described above, and n represents an integer of 1 or more;

$$CF_2=CFOCF_2OCF_2CF(CF_3)OCF_2-X^2$$

wherein $X^2$ is as described above; and $$CF_2=CF-(CF_2)_g-(O-CF_2-CF(CF_3))_h-O-(CF_2)_i-(O)_j-(CF_2)_k-CF(Rf^5)-X^2$$

wherein $X^2$ is as described above, $Rf^5$ represents F or $CF_3$, g represents an integer of 0 or 1, h represents an integer of 0 to 3, i represents an integer of 0 to 5, j represents an integer of 0 or 1, and k represents an integer of 0 to 6.

When the fluorinated alkylene group or fluorinated oxyalkylene group represented by $Rf^3$ has two or more carbon atoms, it has optionally an oxygen atom between two carbon atoms. The fluorinated alkylene group or fluorinated oxyalkylene group has optionally an aromatic ring. The fluorinated alkylene group or fluorinated oxyalkylene group may be linear or branched as long as a part or all of H bonded to the carbon atom is replaced by F. $Rf^3$ is preferably a fluorinated oxyalkylene group, and more preferably a fluorinated oxyalkylene group represented by $-(ORf^2)_p-$ wherein $Rf^2$ and p are as described above.

Among them, the crosslinkable group-containing monomer (1) is preferably a crosslinkable group-containing monomer represented by the general formula:

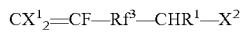

$CX^1_2=CF-Rf^3-CHR^1-X^2$ wherein $X^1$, $X^2$, $Rf^3$ and $R^1$ are as described above; and more preferably a crosslinkable group-containing monomer represented by the general formula (3):

$CF_2=CF(OCF_2CF(CF_3))_n(OCF_2CF_2CH_2)_mI$ wherein n represents an integer of 0 to 3, and m represents an integer of 1 to 5;

because the member to be compressed for an electrochemical device is much better in compression set resistance, electrolyte resistance and also releasability at the time of molding.

The crosslinkable monomer represented by the general formula (3) is preferably at least one selected from the group consisting of $CF_2=CF-OCF_2CF_2CH_2I$, $CF_2=CF-(OCF_2CF_2CH_2)_2I$, $CF_2=CF-(OCF_2CF_2CH_2)_3I$, $CF_2=CF-OCF_2CF(CF_3)-OCF_2CF_2CH_2I$ and $CF_2=CF-(OCF_2CF(CF_3))$ 2-$OCF_2CF_2CH_2I$, and more preferably $CF_2=CF-OCF_2CF_2CH_2I$.

The crosslinkable group-containing monomer (2) is represented by the general formula (2):

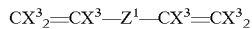

$CX^3_2=CX^3-Z^1-CX^3=CX^3_2$ wherein each $X^3$ independently represents H, F, an alkyl group or a fluorinated alkyl group, and $Z^1$ is an alkylene group, a fluorinated alkylene group, a cycloalkylene group, a fluorinated cycloalkylene group, an oxyalkylene group or a fluorinated oxyalkylene group.

In the formula (2), each $X^3$ is independently H, F, an alkyl group or a fluorinated alkyl group. When the alkyl group or fluorinated alkyl group has two or more carbon atoms, it has optionally an oxygen atom between two carbon atoms. The alkyl group or fluorinated alkyl group has optionally an aromatic ring. The alkyl group or fluorinated alkyl group may be linear or branched.

Each $X^3$ is preferably H, F, an alkyl group having 1 to 5 carbon atoms or a fluorinated alkyl group having 1 to 5 carbon atoms, more preferably H, F, $CH_3$ or $CF_3$, still more preferably H or F, and particularly preferably H, because the member to be compressed for an electrochemical device is much better in compression set resistance, electrolyte resistance and also releasability at the time of molding.

$Z^1$ is an alkylene group, a fluorinated alkylene group, a cycloalkylene group, a fluorinated cycloalkylene group, an oxyalkylene group or a fluorinated oxyalkylene group. When each of these groups has two or more carbon atoms, it has optionally an oxygen atom between two carbon atoms. Each of these groups optionally has an aromatic ring. Each of these groups may be linear or branched.

$Z^1$ is preferably a fluoroalkylene group and more preferably a fluoropolyoxyalkylene group. The fluoropolyoxyalkylene group is preferably a group represented by the formula:

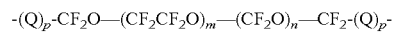

$-(Q)_p-CF_2O-(CF_2CF_2O)_m-(CF_2O)_n-CF_2-(Q)_p-$ wherein Q is an alkylene group having 1 to 10 carbon atoms or an oxyalkylene group having 2 to 10 carbon atoms, p is 0 or 1, and m and n are such integers that the m/n ratio is 0.2 to 5 and that the fluoropolyoxyalkylene group represented by the above formula has a molecular weight in the range of 500 to 10,000 and preferably 1,000 to 4,000.

In the above formula, Q is preferably $-CH_2OCH_2-$ or $-CH_2O(CH_2CH_2O)_sCH_2-$ wherein s represents an integer of 1 to 3.

Examples of $Z^1$ can include a group represented by the formula:

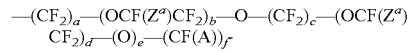

$-(CF_2)_a-(OCF(Z^a)CF_2)_b-O-(CF_2)_c-(OCF(Z^a)CF_2)_d-(O)_e-(CF(A))_f-$ wherein a represents an integer of 0 to 2, b represents an integer of 0 to 2, c represents an integer of 0 to 8, d represents an integer of 0 to 2, e represents an integer of 0 or 1, f represents an integer of 0 to 6, each $Z^a$ independently represents F or $CF_3$, and A represents F or a perfluoroalkyl group. Examples of the crosslinkable group-containing monomer containing such a group include a monomer represented by the formula: $CF_2=CF-O-(CF_2)_n-O-CF=CF_2$ wherein n represents an integer of 2 to 6; and a monomer represented by the formula: $CF_2=CF-(CF_2)_a-O-(CF_2)_n-O-(CF_2)_b-CF=CF_2$ wherein n represents an integer of 2 to 6, a represents 0 or 1, and b represents 0 or 1.

Among them, the crosslinkable group-containing monomer (2) is preferably at least one selected from the group consisting of a crosslinkable group-containing monomer represented by the general formula (4):

$CH_2=CH-(CF_2)_k-CH=CH_2$ wherein k represents an integer of 2 to 8;

a crosslinkable group-containing monomer represented by the general formula (5):

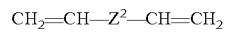

$CH_2=CH-Z^2-CH=CH_2$ wherein $Z^2$ represents $-CH_2OCH_2-CF_2O-(CF_2CF_2O)_m-(CF_2O)_n-CF_2-CH_2OCH_2-$ wherein m/n is 0.2 to 5; and a crosslinkable group-containing monomer represented by the general formula (6):

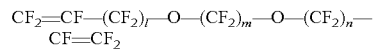

$CF_2=CF-(CF_2)_l-O-(CF_2)_m-O-(CF_2)_n-CF=CF_2$ wherein each of l and n independently represents 0 or 1, and m represents an integer of 2 to 6;

because the member to be compressed for an electrochemical device is much better in compression set resistance, electrolyte resistance and also releasability at the time of molding.

Among them, the crosslinkable group-containing monomer (2) is more preferably at least one selected from the group consisting of the crosslinkable group-containing monomers represented by the general formulae (4) and (5), still more preferably the crosslinkable group-containing monomer represented by the general formula (4), particularly preferably at least one selected from the group consisting of $CH_2=CH-(CF_2)_4-CH=CH_2$ and $CH_2=CH-(CF_2)_6-CH=CH_2$, and most preferably $CH_2=CH-$ $(CF_2)_6$—CH=CH$_2$, because the member to be compressed for an electrochemical device is much better in compression set resistance, electrolyte resistance and also releasability at the time of molding.

The fluorine-containing elastomer preferably contains a fluorinated monomer unit (except for the crosslinkable group-containing monomer units represented by the general formulae (1) and (2)), in addition to the crosslinkable group-containing monomer unit.

Examples of the fluorinated monomer include a fluorinated monomer represented by the formula (7):

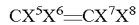

wherein each of $X^5$ to $X^7$ is independently H or a halogen atom; $X^8$ is H, a halogen atom, a carboxyl group and a fluorinated alkyl group or a fluorinated alkoxy group having 1 to 9 carbon atoms and optionally containing an oxygen atom between two carbon atoms when the fluorinated alkyl group or the fluorinated alkoxy group has two or more carbon atoms; and at least one of $X^5$ to $X^8$ is F, a fluorinated alkyl group or a fluorinated alkoxy group.

Examples of the fluorinated monomer include hexafluoropropylene (HFP), vinylidene fluoride (VdF), tetrafluoroethylene (TFE), trifluoroethylene, pentafluoropropylene, vinyl fluoride, hexafluoroisobutene, chlorotrifluoroethylene (CTFE), trifluoropropylene, pentafluoropropylene, tetrafluoropropylene, hexafluoroisobutene and vinyl fluoride. However, the fluorinated monomer is preferably vinylidene fluoride (VdF), hexafluoropropylene (HFP), tetrafluoroethylene (TFE), trifluoroethylene, pentafluoropropylene, vinyl fluoride or hexafluoroisobutene from the viewpoint of easiness of acquisition of an elastomer composition.

Further, the fluorine-containing elastomer may contain, as a fluorinated monomer unit, a functional group-containing monomer unit different from the crosslinkable group-containing monomer units represented by the general formulae (1) and (2).

The fluorine-containing elastomer may contain a non-fluorinated monomer unit. Examples of the non-fluorinated monomer include an alpha-olefin monomer having 2 to 10 carbon atoms such as ethylene, propylene, butene or pentene.

The fluorine-containing elastomer preferably further contains a TFE unit in addition to the crosslinkable group-containing monomer units represented by the general formulae (1) and (2), because the member to be compressed for an electrochemical device is much better in compression set resistance, electrolyte resistance and also releasability at the time of molding.

The content of TFE unit in the fluorine-containing elastomer is preferably 15 to 60 mol %, more preferably 17 mol % or more and still more preferably 19 mol % or more, and more preferably 58 mol % or less and more preferably 56 mol % or less, based on the total monomer units.

The fluorine-containing elastomer preferably further contains a VdF unit and more preferably a TFE unit and a Vdf unit, in addition to the crosslinkable group-containing monomer units represented by the general formulae (1) and (2), because the member to be compressed for an electrochemical device is much better in compression set resistance, electrolyte resistance and also releasability at the time of molding.

The content of VdF unit in the fluorine-containing elastomer is preferably 35 to 70 mol %, more preferably 45 mol % or more, and 60 mol % or less, based on the total monomer units.

The fluorine-containing elastomer preferably further contains a HFP unit, more preferably at least one selected from the group consisting of a TFE unit and a HFP unit, and still more preferably at least one selected from the group consisting of a TFE unit, a VdF unit and a HFP unit, in addition to the crosslinkable group-containing monomer units represented by the general formulae (1) and (2), because the member to be compressed for an electrochemical device is much better in compression set resistance, electrolyte resistance and also releasability at the time of molding.

Examples of the fluorine-containing elastomer can include a VdF/HFP/crosslinkable group-containing monomer copolymer, a VdF/HFP/TFE/crosslinkable group-containing monomer copolymer, a VdF/CTFE/crosslinkable group-containing monomer copolymer, a VdF/CTFE/TFE/crosslinkable group-containing monomer copolymer, a VdF/TFE/Pr/crosslinkable group-containing monomer copolymer and a VdF/Et/HFP/crosslinkable group-containing monomer copolymer. Among them, the fluorine-containing elastomer is preferably a VdF/HFP/TFE/crosslinkable group-containing monomer copolymer.

When the fluorine-containing elastomer is a VdF/HFP/crosslinkable group-containing monomer copolymer, the molar ratio of VdF/HFP is preferably (45 to 85)/(55 to 15) (mol %), more preferably (50 to 80)/(50 to 20) (mol %), and more preferably (60 to 80)/(40 to 20) (mol %).

When the fluorine-containing elastomer is a VdF/HFP/TFE/crosslinkable group-containing monomer copolymer, the molar ratio of VdF/HFP/TFE/ is preferably (25 to 80)/(10 to 40)/(10 to 35) (mol %), more preferably (31 to 74)/(13 to 37)/(13 to 32) (mol %) and still more preferably (37 to 68)/(16 to 34)/(16 to 29) (mol %).

Examples of the fluorine-containing elastomer can include, in addition to the above fluorine-containing elastomer, a TFE/propylene/crosslinkable group-containing monomer copolymer, a TFE/propylene/VdF/crosslinkable group-containing monomer copolymer, an ethylene/HFP/crosslinkable group-containing monomer copolymer, an ethylene/HFP/VdF/crosslinkable group-containing monomer copolymer, and an ethylene/HFP/TFE/crosslinkable group-containing monomer copolymer.

The content of the crosslinkable group-containing monomer units represented by the general formulae (1) and (2) in the fluorine-containing elastomer is preferably 0.001 to 5 mol %, more preferably 0.01 to 3 mol %, still more preferably 0.03 to 1 mol %, and particularly preferably 0.05 to 0.5 mol %, based on the total content of the fluorinated monomer unit and the non-fluorinated monomer unit (except for the content of the crosslinkable group-containing monomer units represented by the general formulas (1) and (2)). Further, the content of the crosslinkable group-containing monomer unit represented by the general formula (1) in the fluorine-containing elastomer may be such a content that the total content rate of an iodine atom or a bromine atom in the fluorine-containing elastomer is in the range described later.

The monomeric composition of the fluorine-containing elastomer can be measured by $1^9$F-NMR.

The fluorine content rate in the fluorine-containing elastomer is preferably 67% by mass or more, more preferably 68% by mass or more and still more preferably 69% by mass or more, because the member to be compressed for an electrochemical device is excellent in electrolyte resistance. The fluorine content rate can be calculated based on the monomeric composition of the fluorine-containing elastomer.

The fluorine-containing elastomer may be obtained by using a chain transfer agent at the time of polymerization.

The chain transfer agent may be a bromine compound or an iodine compound. The use of a bromine compound or an iodine compound as a chain transfer agent not only enables the bromine atom or iodine atom derived from the crosslinkable group-containing monomer represented by the general formula (1) to be introduced but also enables the bromine atom or iodine atom derived from the chain transfer agent to be introduced into the main chain terminal and the side chain terminal of the polymer, which in turn can bring the distance between crosslinking points close to a uniform value. As a result, the obtained member to be compressed for an electrochemical device can be further improved in compression set resistance, electrolyte resistance and also releasability at the time of molding. Therefore, the fluorine-containing elastomer preferably has an iodine atom or a bromine atom at one or both of the main chain terminal and the side chain terminal of the polymer. Further, the fluorine-containing elastomer is preferably obtained by a polymerization process using a bromine compound or an iodine compound as a chain transfer agent.

Examples of the polymerization process using a bromine compound or an iodine compound include an emulsion polymerization process that is carried out in an aqueous medium in the presence of a bromine compound or an iodine compound in a substantially oxygen-free state under pressure (an iodine transfer polymerization process). Representative examples of the bromine compound or the iodine compound include a compound represented by the general formula:

$$R^2I_xBr_y$$

wherein each of x and y is an integer of 0 to 2 and they satisfy $1 \leq x+y \leq 2$, and $R^2$ is a saturated or unsaturated fluorohydrocarbon group or chlorofluorohydrocarbon group having 1 to 16 carbon atoms or a hydrocarbon group having 1 to 3 carbon atoms, which optionally contains an oxygen atom. The use of a bromine compound or an iodine compound causes a bromine atom or an iodine to be introduced into a polymer and to function as a crosslinking point.

The total content rate of an iodine atom and a bromine atom in the fluorine-containing elastomer is preferably 0.001% by mass or more, more preferably 0.01% by mass or more and still more preferably 0.1% by mass or more, and preferably 10% by mass or less and more preferably 5% by mass or less. The bond positions of an iodine atom and a bromine atom in the fluorine-containing elastomer may be either one or both the main chain terminal and the side chain terminal of the fluorine-containing elastomer. The total content rate of an iodine atom and a bromine atom include the content rate of an iodine atom and a bromine atom introduced into a polymer by an iodine compound or a bromine compound used as a chain transfer agent, and the content rate of an iodine atom and a bromine atom introduced into a polymer by polymerizing the crosslinkable group-containing monomer represented by the general formula (1).

The total content rate of an iodine atom and a bromine atom can be determined using a Shimadzu 20A ion chromatograph, after mixing 12 mg of a fluorine-containing elastomer with 5 mg of $Na_2SO_3$, subjecting it to combustion in oxygen in a quartz flask followed by absorption in an absorbing solution, that is, 30 mg of a mixture of $Na_2CO_3$ and $K_2CO_3$ in a ratio of 1:1 (weight ratio) dissolved in 20 ml of pure water, and then allowing it to stand for 30 minutes. Calibration curves can be prepared using KI standard solutions and KBr standard solutions, solutions containing 0.5 ppm and 1.0 ppm of an iodide ion and a bromine ion.

Examples of the iodine compound and bromine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, monoiodomonobromo-substituted benzene, diiodomonobromo-substituted benzene and 2-iodoethyl-substituted benzene and 2-bromoethyl-substituted benzene. These compounds may be used singly or in combination with each other.

Among these, 1,4-diiodoperfluorobutane, 1,6-diiodoperfluorohexane and 2-iodoperfluoropropane are preferably used, from the viewpoint of polymerization reactivity, crosslinking reactivity, availability and the like.

The glass transition temperature of the fluorine-containing elastomer is preferably −70° C. or more, more preferably −60° C. or more, and still more preferably −50° C. or more, because the member to be compressed for an electrochemical device is excellent in compression set resistance at a high temperature. It is also preferably 5° C. or less, more preferably 0° C. or less and still more preferably −3° C. or less, because the member to be compressed for an electrochemical device is good in low-temperature resistance.

The glass transition temperature can be determined by using a differential scanning calorimeter (DSC822e manufactured by Mettler Toledo, or X-DSC823e manufactured by Hitachi Technoscience) and heating 10 mg of a sample at a heating rate of 20° C./min to obtain a DSC curve, 2 and reading out, as a glass transition temperature, the temperature at the midpoint between two points of intersection between the extended lines of the baselines after and before secondary transition of the DSC curve and the tangent line at the inflection point of the DSC curve.

The Mooney viscosity ML (1+10) of the fluorine-containing elastomer at 121° C. is preferably 10 or more and more preferably 15 or more, and preferably 120 or less and more preferably 100 or less, because the member to be compressed for an electrochemical device is good in heat resistance. Mooney viscosity is measured in accordance with ASTM-D1646 and JIS K6300.

The fluorine-containing elastomer has preferably a number average molecular weight (Mn) of 1,000 to 300,000 and more preferably 10,000 to 200,000. The fluorine-containing elastomer has preferably a molecular weight distribution (weight average molecular weight (Mw)/number average molecular weight (Mn)) of 1.3 or more, more preferably 1.5 or more, and preferably 8 or less. The number average molecular weight (Mn), the weight average molecular weight (Mw), and Mw/Mn are measured by the GPC method.

The fluorine-containing elastomer may be a branched fluorine-containing elastomer. The branched fluorine-containing elastomer preferably has a Mark-Houwink gradient (a) of less than 0.6 when the absolute weight molecular weight and the intrinsic viscosity are plotted on a Mark-Houwink plot, with the horizontal axis being the absolute weight molecular weight and the vertical axis being the intrinsic viscosity. The lower limit may be 0.

The Mark-Houwink plot is prepared to check the state of long-chain branching of a polymer, and is a graph with the horizontal axis being the absolute weight molecular weight and the vertical axis being the intrinsic viscosity. This Mark-Houwink plot enables the state of long-chain branching of the polymer to be checked, and in particular, the Mark-Houwink gradient a calculated by plotting the absolute weight molecular weight and the intrinsic viscosity enable the degree of long-chain branching of the fluorine-containing elastomer to be determined and can be also used as a parameter for identifying (classifying) a substance. For the polymers having the same absolute weight molecular weight, the polymer having a high degree of long-chain branching has a low molecular weight in the longest chain and is low in intrinsic viscosity. Therefore, for the polymers having the same absolute weight molecular weight, the smaller gradient a (that is, the lower intrinsic viscosity with respect to the absolute weight molecular weight) shows the higher degree of long-chain branching. On the other hand, the gradient a of a linear polymer is large. The absolute weight molecular weight can be determined, for example, by GPC-light scattering.

The above-described crosslinkable composition preferably further contains a fluorine-containing elastomer that contains no crosslinkable group-containing monomer unit represented by the general formulae (1) or (2) (hereinafter, sometimes referred to as a "fluorine-containing elastomer (B)", in addition to a fluorine-containing elastomer that contains the crosslinkable group-containing monomer units represented by the general formulae (1) and (2) (hereinafter, sometimes referred to as a "fluorine-containing elastomer (A)".

The fluorine-containing elastomer (B) is preferably at least one selected from the group consisting of a VdF/HFP copolymer, a VdF/HFP/TFE copolymer, a TFE/propylene copolymer, a TFE/propylene/VdF copolymer, an ethylene/HFP copolymer, an ethylene/HFP/VdF copolymer, an ethylene/HFP/TFE copolymer, a VdF/TFE/perfluoro (alkylvinylether) (PAVE) copolymer and a VdF/CTFE copolymer, and more preferably at least one selected from the group consisting of a VdF/HFP copolymer and a VdF/HFP/TFE copolymer.

Examples of PAVE include perfluoro(methylvinylether) (PMVE), perfluoro(ethylvinylether) (PEVE) and perfluoro (propylvinylether) (PPVE).

The fluorine-containing elastomer (B) is preferably a peroxide-crosslinkable fluorine-containing elastomer, and more preferably a fluorine-containing elastomer having a peroxide-crosslinkable crosslinking site, such as an iodide atom, a bromine atom or a cyano group. Further, the fluorine-containing elastomer (B) is preferably obtained by a polymerization process using a bromine compound or an iodine compound as a chain transfer agent.

The glass transition temperature of the fluorine-containing elastomer (B) is preferably −70° C. or more, more preferably −60° C. or more, and still more preferably −50° C. or more. It is also preferably 5° C. or less, more preferably 0° C. or less and still more preferably −3° C. or less, because the member to be compressed for an electrochemical device is good in low-temperature resistance.

The Mooney viscosity ML (1+10) of the fluorine-containing elastomer (B) at 121° C. is preferably 10 or more and more preferably 20 or more, and preferably 120 or less and more preferably 100 or less.

The fluorine-containing elastomer (B) has preferably a number average molecular weight (Mn) of 1,000 to 250,000, more preferably 5,000 to 140,000, and still more preferably 15,000 to 100,000. The fluorine-containing elastomer (B) has preferably a molecular weight distribution (weight average molecular weight (Mw)/number average molecular weight (Mn)) of 1.1 or more preferably 4 or less.

The fluorine-containing elastomer (B) is preferably a linear fluorine-containing polymer. The fluorine-containing elastomer (B) has a Mark-Houwink gradient a of 0.6 or more when the absolute weight molecular weight and the intrinsic viscosity are plotted on a Mark-Houwink plot, with the horizontal axis being the absolute weight molecular weight and the vertical axis being the intrinsic viscosity. The upper limit may be 1.

The mass ratio ((A)/(B)) of the fluorine-containing elastomer (A) and the fluorine-containing elastomer (B) in the above-described crosslinkable composition is preferably 10 to 90/90 to 10, and more preferably 20 to 80/80 to 20.

The composition containing the fluorine-containing elastomer (A) and the fluorine-containing elastomer (B) can be prepared, for example, by any one of the following methods, but is not limited thereto:

(1) a method comprising polymerizing the fluorine-containing elastomer (A) and then successively polymerizing the fluorine-containing elastomer (B) in the same polymerization tank (a one-tank method);

(2) a method comprising mixing an aqueous dispersion of the fluorine-containing elastomer (A) and an aqueous dispersion of the fluorine-containing elastomer (B) (a wet mixing method);

(3) a method comprising dry blending the fluorine-containing elastomer (A) and the fluorine-containing elastomer (B) (a dry mixing method); and (4) a method comprising mixing a dispersion of the fluorine-containing elastomer (A) in an organic solvent and a dispersion of the fluorine-containing elastomer (B) in an organic solvent.

The fluorine-containing elastomer can be produced by a general radical polymerization process. The polymerization may be any of bulk polymerization, solution polymerization, suspension polymerization and emulsion polymerization, but emulsion polymerization is preferred because of it ease to be industrially carried out.

The above-described polymerization can use a polymerization initiator, a chain transfer agent, a surfactant and a solvent, which each is conventionally known one.

The above-described crosslinkable composition preferably contains a fluorine-containing elastomer and a cross-linking agent. The cross-linking agent is not limited as long as it is a cross-linking agent conventionally used in polyamine crosslinking, polyol crosslinking, peroxide crosslinking and the like, but is preferably at least one selected from the group consisting of a polyamine compound, a polyhydroxy compound and a peroxide cross-linking agent, and more preferably a peroxide cross-linking agent, because the fluorine-containing elastomer containing the crosslinkable group-containing monomer units represented by the general formulae (1) and (2) is a peroxide-crosslinkable fluorine-containing elastomer.

The peroxide cross-linking agent is preferably an organic peroxide. The organic peroxide may be any organic peroxide that can easily generate a radical in the presence of heat or an oxidation-reduction system. Examples of the organic peroxide can include 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, t-butyl peroxy maleic acid, t-butylperoxy isopropyl carbonate and t-butylperoxy benzoate. Among them, 2,5-dimethyl-2,5-di(t-butylperoxy)hexane and 2,5-dimethyl-2,5-di(t-butylperoxy)hexyne-3 are preferred.

When the cross-linking agent is an organic peroxide, the crosslinkable composition preferably contains a cross-linking aid. Examples of the cross-linking aid include triallyl cyanurate, trimethallyl isocyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-s-triazine, triallyl phosphite, N,N-diallylacrylamide, 1,6-divinyldodecafluorohexane, hexaallyl phosphoramide, N,N,N',N'-tetraallylphthalamide, N,N,N',N'-tetraallylnalonamide, trivinyl isocyanurate, 2,4,6-trivinylmethyltrisiloxane, tri(5-norbornene-2-methylene)cyanurate and triallyl phosphite. Among them, triallyl isocyanurate (TAIC) is preferred from the viewpoint of excellent crosslinkability and excellent physical properties of the member to be compressed for an electrochemical device.

The content of the cross-linking agent in the above-described crosslinkable composition is preferably 0.01 to 10 parts by mass and more preferably 0.1 to 5 parts by mass, based on 100 parts by mass of the fluorine-containing elastomer. Too little cross-linking agent results in an insufficient degree of crosslinking which tends to impair the performance of the obtained member to be compressed for an electrochemical device. In contrast, too much cross-linking agent results in too high crosslinking density, which increase a crosslinking time and is economically not preferred.

The formulation amount of the cross-linking aid is preferably 0.01 to 10 parts by mass and more preferably 0.1 to 5.0 parts by mass, based on 100 parts by mass of the fluorine-containing elastomer. Too little cross-linking aid tends to make the crosslinking time too long for practical use. In contrast, too much cross-linking aid tends to make the crosslinking time too short and to deteriorate the compression set resistance of the member to be compressed for an electrochemical device.

The above-described crosslinkable composition also preferably contains a filler. Examples of the filler include a metal oxide such as calcium oxide, titanium oxide or aluminum oxide; a metal hydroxide such as magnesium hydroxide, aluminum hydroxide or calcium hydroxide; a carbonate such as magnesium carbonate, aluminum carbonate, calcium carbonate or barium carbonate; a silicate such as magnesium silicate, calcium silicate, sodium silicate or aluminum silicate; a sulfate such as aluminum sulfate, calcium sulfate or barium sulfate; a metal sulfide such as synthetic hydrotalcite, molybdenum disulfide, iron sulfide or copper sulfide; diatomaceous earth, asbestos, lithopone (zinc sulfide/barium sulfide), graphite, carbon black, carbon fluoride, calcium fluoride, coke, quartz fine powder, zinc white (zinc oxide), talc, mica powder, wollastonite, a carbon fiber, an aramid fiber, various whiskers, a glass fiber, an organic reinforcing agent, an organic filler, polytetrafluoroethylene, mica, silica, celite and clay.

The content of the filler in the crosslinkable composition is preferably 0.01 to 50 parts by mass and more preferably 1 to 30 parts by mass, based on 100 parts by mass of the fluorine-containing elastomer.

The crosslinkable composition is preferably obtained by kneading the fluorine-containing elastomer and, if desired, a cross-linking agent, a cross-linking aid, a filler or the like.

The kneading can be carried out by using an open roll mill, a Banbury mixer, a pressure kneader, an extruder and the like.

The member to be compressed for an electrochemical device of the present disclosure can be obtained by crosslinking the crosslinkable composition. The member to be compressed for an electrochemical device of the present disclosure can be also produced by molding the crosslinkable composition and crosslinking the obtained molded product or by simultaneously molding and crosslinking.

The molding process is not limited, and examples thereof include compression molding, extrusion molding, transfer molding and injection molding. The member to be compressed for an electrochemical device of the present disclosure can be produced with high productivity even by a molding process using a mold, because it is excellent in releasability.

The crosslinking can be carried out, for example, by a conventional method such as a method of heating and compressing with a mold, a method of press fitting into a heated mold, or a method of extruding with an extruder followed by crosslinking. The crosslinking is also carried out in the order of primary crosslinking and finally secondary crosslinking to obtain the member to be compressed for an electrochemical device of the present disclosure.

For the primary crosslinking conditions, the crosslinking is preferably carried out at 150 to 230° C. for 5 to 120 minutes, more preferably 150 to 200° C. for 5 to 90 minutes, and particularly preferably at 160 to 190° C. for 10 to 60 minutes. The crosslinking means may be any known crosslinking means, and examples thereof include press crosslinking.

For the secondary crosslinking conditions, the crosslinking is preferably carried out at 160 to 320° C. for 2 to 168 hours and more preferably at 180 to 310° C. for 4 to 36 hours. The crosslinking means may be any known crosslinking means, and examples thereof include oven crosslinking.

The size and shape of the member to be compressed for an electrochemical device of the present disclosure may be appropriately set depending on the intended use, and is not limited. The shape of the member to be compressed for an electrochemical device of the present disclosure may be, for example, an annular shape. Further, the member to be compressed for an electrochemical device of the present disclosure may have such a shape as a square, a circle, an oval, or a rounded rectangle in planar view, and may have a through hole in the central portion thereof.

The member to be compressed for an electrochemical device of the present disclosure is a member that constitutes an electrochemical device and is used by compressing to deforming it. The electrochemical device is not limited as long as it is a device in which switching is carried out between electrical energy and chemical energy. Examples of the electrochemical device include a battery such as a lithium-ion secondary battery, a lithium-ion capacitor, a hybrid capacitor, an electric double layer capacitor and an aluminum electrolytic capacitor. The electrochemical device is preferably a lithium-ion secondary battery and a lithium-ion capacitor. Examples of the constituent member of the electrochemical device include a sealing member for an electrochemical device and an insulating member for an electrochemical device.

The member to be compressed for an electrochemical device of the present disclosure can be suitably used, for example, as a sealing member such as a sealing gasket or a sealing packing, and an insulating member such as an insulating gasket or an insulating packing. The sealing member is a member used to prevent liquid or gas from leaking out or to prevent liquid or gas from intruding from the outside. The insulating member is a member used to insulate electricity. The members to be compressed for an electrochemical device of the present disclosure may be a member used for both sealing and insulating.

The member to be compressed for an electrochemical device of the present disclosure can be suitably used as a member to be compressed for a battery, and particularly suitably as a member to be compressed for a secondary battery, because it is excellent in compression set resistance and electrolyte resistance.

The member to be compressed for an electrochemical device of the present disclosure has excellent resistance (electrolyte resistance) to an electrolyte used in a non-aqueous electrolyte secondary battery. Therefore, the member to be compressed for an electrochemical device of the present disclosure can be suitably used as a member to be compressed for a non-aqueous electrolyte secondary battery, and particularly suitably as a member to be compressed for a non-aqueous electrolyte lithium-ion secondary battery.

The non-aqueous electrolyte secondary battery comprises a positive electrode plate (positive electrode sheet), a separator, a negative electrode plate (negative electrode sheet), a battery case, a sealing body and a gasket. Examples of the non-aqueous electrolyte secondary battery include a non-aqueous electrolyte secondary battery comprising, as the gasket, the member to be compressed for an electrochemical device of the present disclosure.

The non-aqueous electrolyte secondary battery comprises, for example, a battery case having an opening; a positive electrode plate, a separator, a negative electrode plate and a non-aqueous electrolytic solution housed in the battery case; and a sealing body for sealing the opening of the battery case. The battery case and the sealing body are sealed with a gasket. The sealing body may double as an external connection terminal (positive electrode terminal or negative electrode terminal).

Further, the non-aqueous electrolyte secondary battery comprises, for example, a battery case having an opening; a positive electrode plate, a separator, a negative electrode plate and a non-aqueous electrolytic solution housed in the battery case; and a sealing body for sealing the opening of the battery case. The sealing body is provided with an electrode terminal (a positive electrode terminal or a negative electrode terminal) that is electrically connected to the electrode plate (positive electrode plate or negative electrode plate). The sealing body and the electrode terminal are sealed with a gasket.

Sealing with the gasket prevents the non-aqueous electrolytic solution from leaking out and also prevents water from infiltrating into the inside of the non-aqueous electrolyte secondary battery. In addition, sealing with the gasket insulates between the positive electrode terminal and the negative electrode terminal to prevent a short circuit between the terminals. Therefore, the gasket is required to have insulating properties as well as a low compression set rate and an excellent electrolyte resistance.

In the non-aqueous electrolyte secondary battery comprising the member to be compressed for an electrochemical device of the present disclosure, the member to be compressed for an electrochemical device is used as a gasket to seal the members from each other. The member to be compressed for an electrochemical device of the present disclosure has insulating properties as well as a low compression set rate and an excellent electrolyte resistance. Therefore, according to the non-aqueous electrolyte secondary battery, the insulating properties are maintained for a long period of time, and the leakage of the non-aqueous electrolytic solution and the infiltration of water from the outside is not easy to occur and are prevented for a long period of time.

The electrolytic solution used in the non-aqueous electrolyte secondary battery preferably contains a solvent. The content of the solvent in the electrolytic solution is preferably 70 to 99.999% by mass, more preferably 80% by mass or more, and more preferably 92% by mass or less.

The solvent preferably contains at least one selected from the group consisting of a carbonate and a carboxylic acid ester. The carbonate may be a cyclic carbonate or a chain carbonate.

The cyclic carbonate may be a non-fluorinated cyclic carbonate or a fluorinated cyclic carbonate.

The non-fluorinated saturated cyclic carbonate is preferably at least one selected from the group consisting of ethylene carbonate, propylene carbonate, cis-2,3-pentylene carbonate, cis-2,3-butylene carbonate, 2,3-pentylene carbonate, 2,3-butylene carbonate, 1,2-pentylene carbonate, 1,2-butylene carbonate and butylene carbonate.

The fluorinated cyclic carbonate may be a fluorinated saturated cyclic carbonate or a fluorinated unsaturated cyclic carbonate.

The fluorinated saturated cyclic carbonate is a saturated cyclic carbonate having a fluorine atom, and specific examples thereof include a compound represented by the following general formula (A):

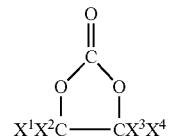

(A)

wherein $X^1$ to $X^4$ are the same or different, and each of $X^1$ to $X^4$ represents —H, —CH$_3$, —C$_2$H$_5$, —F, a fluorinated alkyl group optionally having an ether bond, or a fluorinated alkoxy group optionally having an ether bond, provided that at least one of $X^1$ to $X^4$ is —F, a fluorinated alkyl group optionally having an ether bond, or a fluorinated alkoxy group optionally having an ether bond. The fluorinated alkyl group is —CF$_3$, —CF$_2$H, —CH$_2$F or the like.

The chain carbonate may be a non-fluorinated chain carbonate or a fluorinated chain carbonate.

Examples of the non-fluorinated chain carbonate include a hydrocarbon-based chain carbonate such as CH$_3$OCOOCH$_3$ (dimethyl carbonate: DMC), CH$_3$CH$_2$OCOOCH$_2$CH$_3$ (diethyl carbonate: DEC), CH$_3$CH$_2$OCOOCH$_3$ (ethyl methyl carbonate: EMC), CH$_3$OCOOCH$_2$CH$_2$CH$_3$ (methyl propyl carbonate), methyl butyl carbonate, ethyl propyl carbonate, ethyl butyl carbonate, dipropyl carbonate, dibutyl carbonate, methyl isopropyl carbonate, methyl-2-phenylphenyl carbonate, phenyl-2-phenylphenyl carbonate, trans-2,3-pentylene carbonate, trans-2,3-butylene carbonate and ethyl phenyl carbonate. Among them, preferred is at least one selected from the group consisting of ethyl methyl carbonate, diethyl carbonate and dimethyl carbonate.

Examples of the fluorinated chain carbonate include a compound represented by the general formula (B):

  (B)

wherein $Rf^2$ is a fluorinated alkyl group having 1 to 7 carbon atoms, and $R^7$ is an alkyl group having 1 to 7 carbon atoms and optionally containing a fluorine atom.

$Rf^2$ is a fluorinated alkyl group having 1 to 7 carbon atoms, and $R^7$ is an alkyl group having 1 to 7 carbon atoms and optionally containing a fluorine atom. The fluorinated alkyl group is an alkyl group in which at least one hydrogen atom is replaced by a fluorine atom. When $R^7$ is an alkyl group containing a fluorine atom, it is a fluorinated alkyl group.

The chain carboxylic acid ester may be a non-fluorinated chain carboxylic acid ester or a fluorinated chain carboxylic acid ester.

The above-described solvents may be used singly or in any combination of two or more at any ratio.

When the solvent contains the cyclic carbonate and at least one selected from the group consisting of the chain carbonate and the chain carboxylic acid ester, it preferably contains a total of 10 to 100% by volume, more preferably 30 to 100% by volume and still more preferably 50 to 100% by volume of the cyclic carbonate and at least one selected from the group consisting of the chain carbonate and the chain carboxylic acid ester.

The electrolytic solution used in the non-aqueous electrolyte secondary battery preferably further contains an electrolyte salt. The electrolyte salt may be a lithium salt, an ammonium salt and a metal salt as well as any salt that can be used in the electrolytic solution, such as a liquid salt (an ionic liquid), an inorganic polymeric salt or an organic polymeric salt.

The electrolyte salt of the electrolytic solution for a lithium-ion secondary battery is preferably a lithium salt.

The lithium salt may be any lithium salt and specific examples thereof include the following. For example, preferred is at least one lithium salt selected from the group consisting of $LiPF_6$, $LiN(FSO_2)_2$ and $LiBF_4$.

These electrolyte salts may be used singly or in combination of two or more. A preferable example of the combination of two or more electrolyte salts is a combination of $LiPF_6$ and $LiBF_4$, or a combination of $LiPF_6$ and $LiPO_2F_2$, $C_2HsOSO_3Li$ or $FSO_3Li$, which has the effect of improving high temperature storage characteristics, load characteristics and cycle characteristics.

In this case, the formulation amount of $LiPF_6$, $LiN(FSO_2)_2$, $LiBF_4$, $LiPO_2F_2$, $C_2HsOSO_3Li$ or $FSO_3Li$ based on 100% by mass of the entire electrolytic solution is not limited and is any amount that does not significantly impair the effects of the present disclosure, but it is usually 0.01% by mass or more and preferably 0.1% by mass or more, and usually 30% by mass or less, preferably 20% by mass or less, more preferably 10% by mass or less and still more preferably 5% by mass or less, based on the electrolytic solution.

The concentration of each of these electrolyte salts in the electrolytic solution is not limited. The total molar concentration of lithium in the electrolytic solution is preferably 0.3 mol/L or more, more preferably 0.4 mol/L or more and still more preferably 0.5 mol/L or more, and preferably 3 mol/L or less, more preferably 2.5 mol/L or less and still more preferably 2.0 mol/L or less, from the viewpoint of ensuring a good battery performance by keeping the electrical conductivity of the electrolytic solution in a good range.

The embodiments have been described above, but it will be understood that various modifications of the embodiments and details can be made without departing from the sprit and scope of the claims.

EXAMPLES

The embodiments of present disclosure will be now described with reference to Examples, but the present disclosure is not limited to only such examples.

Each of the numerical values shown in the Example was measured by the following method.

<Compositional Analysis>

The measurement was carried out using $^{19}F$-NMR.

Measurement device: VNMRS400, manufactured by Varian Medical Systems, Inc.

Resonance frequency: 376.04 (Sfrq)

Pulse width: 30° (pw=6.8)

<Fluorine Atom Content Rate>

The fluorine atom content rate was calculated from the monomeric composition of a fluorine-containing elastomer.

<Iodine Atom Content Rate>

The iodine atom content rate was determined using a Shimadzu 20A ion chromatograph, after mixing 12 mg of a fluorine-containing elastomer with 5 mg of $Na_2SO_3$, subjecting it to combustion in oxygen in a quartz flask followed by absorption in an absorbing solution, that is, 30 mg of a mixture of $Na_2CO_3$ and $K_2CO_3$ in a ratio of 1:1 (weight ratio) dissolved in 20 ml of pure water, and then allowing it to stand for 30 minutes. Calibration curves were prepared using KI standard solutions, solutions containing 0.5 ppm and 1.0 ppm of an iodide ion.

<Glass Transition Temperature (Tg)>

The glass transition temperature was determined by using a differential scanning calorimeter (DSC822e manufactured by Mettler Toledo, or X-DSC823e manufactured by Hitachi Technoscience) and heating 10 mg of a sample at a heating rate of 20° C./min to obtain a DSC curve, and reading out, as a glass transition temperature, the temperature at the midpoint between two points of intersection between the extended lines of the baselines after and before secondary transition of the DSC curve and the tangent line at the inflection point of the DSC curve.

<Moony Viscosity (ML (1+10) 121° C.)>

Mooney viscosity was measured in accordance with ASTM-D1646 and JIS K6300-1.

Measurement device: an automatic Mooney viscometer, manufactured by Ueshima Seisakusho Co., Ltd.

Rotor speed: 2 rpm

Measurement temperature: 121° C.

<Weight Average Molecular Weight (Mw), Number Average Molecular Weight (Mn) and Molecular Weight Distribution (Mw/Mn)>

The measurement was made under the following conditions with the following device.

Device: HLC-8020 (manufactured by Tosoh Corporation)

Columns: two GPC KF-806M
  one GPC KF-801
  one GPC KF-802

Detector: Differential refractometer

Developing solvent: Tetrahydrofuran

Temperature: 35° C.

Sample concentration: 0.1% by weight

Standard sample: Various monodisperse polystyrenes ((Mw/Mn)=1.14 (max)), TSK Standard Polystyrene (manufactured by Tosoh Corporation)

<Crosslinking Characteristics>

The crosslinking curve of the crosslinkable composition was obtained using a rheometer (MDRH2030, manufactured by M&K Co. Ltd.) under conditions of 160° C. for 10 minutes. The minimum viscosity (ML), maximum viscosity (MH), the induction time (T10) and the optimum crosslinking time (T90) were determined from the change in torque.

<100% Modulus (M100)>

The crosslinkable composition was subjected to primary crosslinking at 160° C. for 10 minutes and then to secondary crosslinking at 180° C. for 4 hours to obtain a sheet having a thickness of 2 nm. The obtained sheet was used to make a measurement in accordance with JIS-K6251.

<Tensile Breaking Strength (Tb) and Tensile Breaking Elongation (Eb)>

The crosslinkable composition was subjected to primary crosslinking at 160° C. for 10 minutes and then to secondary crosslinking at 180° C. for 4 hours to obtain a sheet having a thickness of 2 mm. The obtained sheet was used to make a measurement in accordance with JIS-K6251.

<Hardness>

The crosslinkable composition was subjected to primary crosslinking at 160° C. for 10 minutes and then to secondary crosslinking at 180° C. for 4 hours to obtain a sheet having a thickness of 2 nm. The obtained sheet was used to measure its hardness (PEAK value) in accordance with JIS-K6253.

<Compression Set>

The compression set of an O-ring having a nominal diameter of P-24 specified in JIS-B2401 was determined in accordance with JIS-K6262. Specifically, the O-ring after the secondary crosslinking obtained in each of the following Examples and Comparative Examples was held in a compressed state under a 25%-increased pressure at 200° C. for 72 hours and the pressure then was released. The O-ring was allowed to stand in a temperature-controlled room at 25° C. for 30 minutes, and its thickness was then measured to determine its compression set.

<Electrolyte Resistance>

A specimen of 2 cm square was cut out from a crosslinked sheet of 2 mm in thickness, soaked in a non-aqueous electrolytic solution for a lithium-ion secondary battery (1M-LiPF$_6$, ethylene carbonate/ethyl methyl carbonate=30/70 (% by volume)) at 60° C., and allowed to stand for 72 hours. Thereafter, the volume swelling rate was determined according to the following equation. A lower volume swelling rate leads to a much better electrolyte resistance.

$$\Delta V = (V - Vo)/Vo \times 100$$

wherein: ΔV: a volume swelling rate;
Vo: a volume of a specimen before soaking; and
V: a volume of a specimen after soaking.

<Releasability>

A mold having cavities capable of preparing 65 O-rings at a time was placed in a vacuum press, the chamber was degassed, and the mold was then filled with a crosslinkable composition. The filled crosslinkable composition was pressed at a pressure of 10 MPa and was subjected to primary crosslinking at 160° C. for 7 minutes to obtain an O-ring sheet. The obtained O-ring sheet was then removed from the mold. These operations were repeated a total of three times with applying no mold release agent. The mold used for molding three times and the O-ring sheet obtained after the third molding were observed to evaluate the releasability according to the following criteria.

○: Few stains due to burrs and deposits on the upper and lower surfaces of the mold, and few O-rings having molding defects x: Many torn O-ring sheet and many stains due to burrs, and pronounced molding defects such as cracks and dents.

Preparation Example 1

Into a polymerization tank having an internal volume of 3 liters provided with an electromagnetic induction stirrer as a stirrer were charged 1,925 g of pure water, 3.85 g of $C_5F_{11}COONH_4$ and 0.096 g of ammonium 2,3,3,3-tetrafluoro-2-[1,1,2,3,3,3-hexafluoro-2-(1,1,2-trifluoroallyloxy)propoxy]propionate. The inside of the system was sufficiently replaced by nitrogen and subjected to a reduced pressure. These operations were repeated five times, the temperature was then raised to 80° C. with stirring at 560 rpm, and the internal pressure was kept at 1.47 MPa so as to be VdF/TFE/HFP=19.3/11.5/69.2 (mol %). Then, 0.019 g of ammonium persulfate (APS) dissolved in pure water was press fitted using nitrogen gas. The reaction was continued until 580 g of a monomer mixture adjusted to VdF/TFE/HFP=50.3/19.3/30.4 (mol %) so as to keep the internal pressure was continuously press fitted. The total amount of APS introduced including the APS dividedly press fitted every 3 hours until the end of the reaction was 0.19 g. When 12.8 g of the monomer mixture had been fed, 0.29 g of 1,6-diiodoperfluorohexane was press fitted using nitrogen gas; when another 201.2 g of the monomer mixture had been fed, 2.09 g of IM monomer ($CF_2$=$CFOCF_2CF_2CH_2I$) was press fitted using nitrogen gas; when another 243.2 g of the monomer mixture had been fed, 2.05 g of 1,6-diiodoperfluorohexane was press fitted using nitrogen gas; when another 303.4 g of the monomer mixture had been fed, 2.09 g of IM monomer was press fitted using nitrogen gas; when another 375.6 g of the monomer mixture had been fed, 2.09 g of IM monomer was press fitted using nitrogen gas; and when another 445.8 g of the monomer mixture had been fed, 2.09 g of IM monomer was press fitted using nitrogen gas.

After completion of the reaction, the pressure in the polymerization tank was returned to atmospheric pressure and cooled to obtain an emulsion. The obtained emulsion had a weight of 2,525 g and a polymer concentration of 23.0% by mass. Table 1 shows various physical properties of the obtained fluorine-containing elastomer 1.

Preparation Example 2

Into a polymerization tank having an internal volume of 138 liters provided with an electromagnetic induction stirrer as a stirrer were charged 82 liters g of pure water, 160 g of $C_5F_{11}CONH_4$ and 8.1 g of ammonium 2,3,3,3-tetrafluoro-2-[1,1,2,3,3,3-hexafluoro-2-(1,1,2-trifluoroallyloxy)propoxy]propionate. The inside of the system was sufficiently vacuum replaced by nitrogen. Thereafter, the temperature was raised to 80° C. with stirring at 150 rpm, and the internal pressure was kept at 2 MPa so as to be VdF/TFE/HFP=18.9/10.2/71.0 (mol %). Then, 4.2 g of APS dissolved in pure water was press fitted using nitrogen gas. The reaction was continued until 25.3 kg of a monomer mixture adjusted to VdF/TFE/HFP=46.9/20.2/32.9 (mol %) so as to keep the internal pressure was continuously press fitted. The total amount of APS introduced including the APS dividedly press fitted every 3 hours until the end of the reaction was 6.2 g. When 505 g of the monomer mixture had been fed, 53.9 g of octafluoro-1,4-diiodobutane was press fitted using nitrogen gas; when another 1,263 g of the monomer mixture had been fed, 153.7 g of IM monomer ($CF_2$=$CFOCF_2CF_2CH_2I$) was press fitted using nitrogen gas; and when another 19.4 kg of the monomer mixture had been fed, 95.4 g of octafluoro-1,4-diiodobutane was press fitted using nitrogen gas.

After completion of the reaction, the pressure in the polymerization tank was returned to atmospheric pressure and cooled to obtain an emulsion. The obtained emulsion had a weight of 105.7 kg and a polymer concentration of 23.4% by mass. Table 1 shows various physical properties of the obtained fluorine-containing elastomer 2.

Preparation Example 3

Into a polymerization tank having an internal volume of 3 liters provided with an electromagnetic induction stirrer as a stirrer were charged 1,730 g of pure water, 1.73 g of $C_5F_{11}CONH_4$ and 0.173 g of ammonium 2,3,3,3-tetrafluoro-2-[1,1,2,3,3,3-hexafluoro-2-(1,1,2-trifluoroallyloxy)propoxy]propionate. The inside of the system was sufficiently replaced by nitrogen and subjected to a reduced pressure. These operations were repeated five times, and 35 g of VdF, 42 g of TFE and 1,090 g of HFP were charged under reduced pressure, and the temperature was raised to 80° C. with stirring. Then, the polymerization was started by press fitting 0.24 g of APS dissolved in 10 g of pure water using nitrogen gas, continued according to the procedures of (a), (b), (c) and (d). After 4 hours, the polymerization was stopped by stopping the stirring and discharging the monomers.

(a) The critical temperature and critical pressure were calculated for the composition of VdF/TFE/HFP=6.5/5.0/88.5 (mol %) in the polymerization tank, according to the Peng-Robinson equation using an Aspen Plus Ver. 11.1 software, and they were found to be Tc=87.7° C. and Pc=3.05 MPa. Further conversion with a conversion temperature of TR=0.95 and a conversion pressure of PR=0.80 results in T=69.7° C. and P=2.44 MPa, and the polymerization conditions, that is, the polymerization temperature and pressure, in this Example (80° C., 4.5 MPa) are equal to or higher than T=69.7° C. and equal to or higher than P=2.44 MPa, respectively.

(b) A monomer mixture of VdF/TFE/HFP (65.2/25.1/9.7 (mol %)) was continuously fed to keep the pressure in the gas phase portion at 3.5 MPa. By the end of the polymerization, 400 g of the monomer mixture was fed into the tank.

(c) The stirring speed was kept at 560 rpm.

(d) When 8 g of the monomer mixture described in (b) had been fed, 1.65 g of octafluoro-1,4-diiodobutane was press fitted using nitrogen gas; when another 28 g of the monomer mixture had been fed, 4.8 g of IM monomer ($CF_2$=$CFOCF_2CF_2CH_2I$) was press fitted using nitrogen gas; and when another 307 g of the monomer mixture had been fed, 2.66 g of octafluoro-1,4-diiodobutane was press fitted using nitrogen gas.

After completion of the reaction, the pressure in the polymerization tank was returned to atmospheric pressure and cooled to obtain an emulsion. The obtained emulsion had a weight of 2,350 g and a polymer concentration of 26.8% by mass. Table 1 shows various physical properties of the obtained fluorine-containing elastomer 3.

Preparation Example 4

An emulsion was obtained in the same manner as in Preparation Example 2, except that: 37.2 g of octafluoro-1,4-diiodobutane was press fitted using nitrogen gas, when 505 g of the monomer mixture had been fed in continuously charging the monomer mixture in Preparation Example 2; 106.2 g of IM monomer was press fitted using nitrogen gas, when another 1,263 g of the monomer mixture had been fed; and 66.0 g of octafluoro-1,4-diiodobutane was press fitted, using nitrogen gas when another 19.4 kg of the monomer mixture had been fed. The obtained emulsion had a weight of 105.6 kg and a polymer concentration of 22.8% by mass. Table 1 shows various physical properties of the obtained fluorine-containing elastomer 4.

Preparation Example 5

Into a polymerization tank having an internal volume of 3 liters provided with an electromagnetic induction stirrer as a stirrer were charged 1,924 g of pure water, 13.9 g of $C_5F_{11}CONH_4$ and 0.096 g of ammonium 2,3,3,3-tetrafluoro-2-[1,1,2,3,3,3-hexafluoro-2-(1,1,2-trifluoroallyloxy)propoxy]propionate. The inside of the system was sufficiently vacuum replaced by nitrogen. Thereafter, the temperature was raised to 80° C. with stirring, and the internal pressure was kept at 2 MPa so as to be VdF/TFE/HFP=18.4/11.4/70.2 (mol %). Then, 0.04 g of APS dissolved in pure water was press fitted using nitrogen gas. The reaction was continued until 618 g of a monomer mixture adjusted to VdF/TFE/HFP=50.6/23.2/26.2 (mol %) so as to keep the internal pressure was continuously press fitted. In addition, 0.04 g of APS dissolved in pure water was press fitted every 3 hours until the end of the reaction. When 19 g of the monomer mixture had been fed, 5.90 g of octafluoro-1,4-diiodobutane was press fitted using nitrogen gas. Further, after APS had been first press fitted using nitrogen gas, 3.74 g of $CH_2$=CH—$(CF_2)_6$—CH=$CH_2$ was press fitted in 20 portions into the tank, every time 30 g of the monomer mixture was fed.

After completion of the reaction, the pressure in the polymerization tank was returned to atmospheric pressure and cooled to obtain an emulsion. The obtained emulsion had a weight of 2,563 g and a polymer concentration of 24.0% by mass. Table 1 shows various physical properties of the obtained fluorine-containing elastomer 5.

Preparation Example 6

An emulsion was obtained in the same manner as in Preparation Example 5, except that 4.23 g of octafluoro-1,4-diiodobutane was press fitted using nitrogen gas when 19 g of the monomer mixture had been fed in continuously charging the monomer mixture in Preparation Example 5.

After completion of the reaction, the pressure in the polymerization tank was returned to atmospheric pressure and cooled to obtain an emulsion. The obtained emulsion had a weight of 2,570 g and a polymer concentration of 23.8% by mass. Table 1 shows various physical properties of the obtained fluorine-containing elastomer 6.

Preparation Example 7

The fluorine-containing elastomer 7 was a fluorine-containing elastomer having the physical properties shown in Table 1.

Preparation Example 8

The fluorine-containing elastomer 8 was a fluorine-containing elastomer having the physical properties shown in Table 1.

TABLE 1

| | | Fluorine-containing elastomer | | | | | | | |
|---|---|---|---|---|---|---|---|---|---|
| | | 1 | 2 | 3 | 4 | 5 | 6 | 7 | 8 |
| Compositional features | VdF mol % | 50.2 | 50.3 | 50.9 | 49.9 | 53.3 | 51.7 | 78.6 | 51.4 |
| | TFE mol % | 19.9 | 21.2 | 19.0 | 20.5 | 25.2 | 26.6 | 0 | 21.9 |
| | HFP mol % | 29.9 | 28.5 | 30.1 | 29.6 | 21.5 | 21.7 | 21.4 | 26.7 |
| | Crosslinkable group-containing monomer | $CF_2$=$CFOCF_2CF_2CH_2I$ | | | | $CH_2$=$CH(CF_2)_6CH$=$CH_2$ | | — | — |
| | Fluorine atom content rate % by mass | 70 | 70 | 70 | 70 | 70 | 70 | 66 | 70 |
| Iodine atom content rate % by mass | | 0.41 | 0.48 | 0.56 | 0.30 | 0.53 | 0.39 | 0.16 | 0.25 |
| Glass transition temperature ° C. | | −4.0 | −4.2 | −4.5 | −3.9 | −9.4 | −6.0 | −20.9 | −4.0 |
| Mooney viscosity (ML(I + 10)121° C.) | | 45 | 22 | 18 | 50 | 26 | 51 | 43 | 31 |
| Weight average molecular weight (×$10^4$) | | 9.6 | 12.8 | 11.1 | 23.3 | 22.7 | 33.4 | 18.5 | 13.2 |
| Number average molecular weight (×$10^4$) | | 6.1 | 5.7 | 6.0 | 10.5 | 6.3 | 6.4 | 11.7 | 8.1 |
| Molecular weight distribution (Mw/Mn) | | 1.6 | 2.0 | 1.8 | 2.2 | 3.6 | 5.2 | 1.6 | 1.6 |

Example 1

A crosslinkable composition was prepared by kneading 100 parts by mass of a fluorine-containing elastomer 1, 20 parts by mass of carbon black (Thermax N990, manufactured by Cancarb Limited), 4 parts by mass of triallyl isocyanurate (TAIC, manufactured by Nippon Kasei Chemical Company Limited (presently Mitsubishi Chemical Corporation)) and 1.5 parts by mass of a peroxide (PERHEXA 25B, manufactured by NOF CORPORATION) at 20 to 70° C. using an 8-inch twin-roll mill by a conventional manner.

The obtained crosslinkable composition was molded using a mold capable of preparing a sheet of 2 mm in thickness and a P-24 size O-ring, and was subjected to primary crosslinking at 160° C. for 10 minutes, then removed from the mold, and subjected to secondary crosslinking at 180° C. for 4 hours in an oven to prepare a crosslinked molded product. Table 2 shows the evaluation results of the crosslinkable composition and the crosslinked molded product.

Examples 2 to 6 and Comparative Examples 1 and 2

Each of crosslinkable compositions and each of crosslinked molded products were prepared in the same manner as in Example 1 except that the type of the fluorine-containing elastomer was changed as shown in Table 2. Table 2 shows the evaluation results of each of the crosslinkable compositions and each of the crosslinked molded products.

Example 7

A fluorine-containing elastomer mixture was prepared by kneading 80 parts by mass of a fluorine-containing elastomer 1 and 20 parts by mass of a fluorine-containing elastomer 8 using an open roll mill. A crosslinkable composition and a crosslinked molded product was prepared in the same manner as in Example 1 except that the obtained fluorine-containing elastomer mixture was used. Table 2 shows the evaluation results of the crosslinkable composition and the crosslinked molded product.

Example 8

A fluorine-containing elastomer mixture was prepared by kneading 50 parts by mass of a fluorine-containing elastomer 3 and 50 parts by mass of a fluorine-containing elastomer 8 using an open roll mill. A crosslinkable composition and a crosslinked molded product was prepared in the same manner as in Example 1 except that the obtained fluorine-containing elastomer mixture was used. Table 2 shows the evaluation results of the crosslinkable composition and the crosslinked molded product.

Example 9

A fluorine-containing elastomer mixture was prepared by kneading 80 parts by mass of a fluorine-containing elastomer 3 and 20 parts by mass of a fluorine-containing elastomer 8 using an open roll mill. A crosslinkable composition and a crosslinked molded product was prepared in the same manner as in Example 1 except that the obtained fluorine-containing elastomer mixture was used. Table 2 shows the evaluation results of the crosslinkable composition and the crosslinked molded product.

TABLE 2

| | | Example | | | | | | | | | Comparative Example | |
|---|---|---|---|---|---|---|---|---|---|---|---|---|
| | | 1 | 2 | 3 | 4 | 5 | 6 | 7 | 8 | 9 | 1 | 2 |
| Formulation of crosslinkable composition | | | | | | | | | | | | |
| Fluorine-containing elastomer | Type | 1 | 2 | 3 | 4 | 5 | 6 | 1 | 3 | 3 | 7 | 8 |
| | parts by mass | 100 | 100 | 100 | 100 | 100 | 100 | 80 | 50 | 80 | 100 | 100 |
| | Type | | | | | | | 8 | 8 | 8 | | |
| | parts by mass | | | | | | | 20 | 50 | 20 | | |

TABLE 2-continued

| | | Example | | | | | | | | | Comparative Example | |
|---|---|---|---|---|---|---|---|---|---|---|---|---|
| | | 1 | 2 | 3 | 4 | 5 | 6 | 7 | 8 | 9 | 1 | 2 |
| Mooney viscosity of polymer | | 45 | 22 | 18 | 50 | 26 | 51 | 42 | 24 | 21 | 43 | 31 |
| Carbon black | parts by mass | 20 | 20 | 20 | 20 | 20 | 20 | 20 | 20 | 20 | 20 | 20 |
| Triallyl isocyanurate | parts by mass | 4 | 4 | 4 | 4 | 4 | 4 | 4 | 4 | 4 | 4 | 4 |
| Peroxide | parts by mass | 1.5 | 1.5 | 1.5 | 1.5 | 1.5 | 1.5 | 1.5 | 1.5 | 1.5 | 1.5 | 1.5 |
| | | Crosslinking characteristics | | | | | | | | | | |
| ML | dNm | 1.0 | 0.8 | 0.6 | 1.6 | 0.7 | 1.5 | 0.8 | 0.8 | 0.7 | 0.5 | 0.7 |
| MH | dNm | 35.1 | 28.9 | 30.3 | 27.4 | 29.9 | 28.1 | 31.2 | 28.4 | 19.1 | 15.4 | 27.9 |
| T10 | min | 0.8 | 1.0 | 1.1 | 1.0 | 1.0 | 1.1 | 0.9 | 1.0 | 1.1 | 1.0 | 1.2 |
| T90 | min | 2.4 | 3.0 | 3.7 | 2.9 | 3.4 | 3.0 | 2.7 | 3.0 | 3.2 | 3.7 | 3.3 |
| | | Ordinary physical properties | | | | | | | | | | |
| M100 | MPa | 5.8 | 5.9 | 6.2 | 4.2 | 6.0 | 5.1 | 5.7 | 4.9 | 5.4 | 2.2 | 3.7 |
| Tb | MPa | 18.1 | 22.7 | 20.2 | 20.2 | 22.0 | 22.4 | 20.1 | 22.1 | 21.4 | 23.0 | 23.6 |
| Eb | % | 220 | 210 | 190 | 230 | 200 | 220 | 230 | 230 | 210 | 420 | 290 |
| | | Physical properties of crosslinked product | | | | | | | | | | |
| Hardness (PEAK) | | 72 | 72 | 72 | 69 | 70 | 69 | 70 | 69 | 70 | 69 | 69 |
| Compression set | % | 11 | 16 | 15 | 16 | 14 | 15 | 13 | 18 | 17 | 28 | 22 |
| | | Electrolyte resistance | | | | | | | | | | |
| Volume swelling rate | % | 25 | 23 | 27 | 19 | 31 | 33 | 27 | 26 | 28 | 111 | 28 |
| | | Releasability | | | | | | | | | | |
| Evaluation of stains on mold or the like (compression molding) | | ○ | ○ | ○ | ○ | ○ | ○ | ○ | ○ | ○ | x | x |

The invention claimed is:

1. A method for sealing a non-aqueous electrolyte secondary battery by using a sealing member, wherein the sealing member is obtained by crosslinking a crosslinkable composition containing a fluorine-containing elastomer containing a unit based on at least one crosslinkable group-containing monomer selected from the group consisting of a crosslinkable group-containing monomer (1) represented by the general formula (1):

$$CX^1{}_2\!\!=\!\!CF\!\!-\!\!Rf^1\!\!-\!\!X^2$$

wherein each $X^1$ independently represents H or F, $Rf^1$ represents a fluorinated alkylene group or a fluorinated oxyalkylene group, and $X^2$ represents I or Br; and each group has optionally an oxygen atom between two carbon atoms when each group has two or more carbon atoms, and each group has optionally an aromatic ring, and each group is linear or branched; and a crosslinkable group-containing monomer (2) represented by the general formula (2):

$$CX^3{}_2\!\!=\!\!CX^3\!\!-\!\!Z^1\!\!-\!\!CX^3\!\!=\!\!CX^3{}_2$$

wherein each $X^3$ independently represents H, F, an alkyl group or a fluorinated alkyl group, and $Z^1$ represents an alkylene group, a fluorinated alkylene group, a cycloalkylene group, a fluorinated cycloalkylene group, an oxyalkylene group or a fluorinated oxyalkylene group; and each group has optionally an oxygen atom between two carbon atoms when each group has two or more carbon atoms, and each group has optionally an aromatic ring, and each group is linear or branched.

2. The method for sealing a non-aqueous electrolyte secondary battery by using a sealing member according to claim 1, wherein the crosslinkable group-containing monomer (1) is a crosslinkable group-containing monomer represented by the general formula (3):

$$CF_2\!\!=\!\!CF(OCF_2CF(CF_3))_n(OCF_2CF_2CH_2)_mI$$

wherein n represents an integer of 0 to 3 and m represents an integer of 1 to 5.

3. The method for sealing a non-aqueous electrolyte secondary battery by using a sealing member according to claim 1, wherein the crosslinkable group-containing monomer (2) is a crosslinkable group-containing monomer represented by the general formula (4):

$$CH_2\!\!=\!\!CH\!\!-\!\!(CF_2)_k\!\!-\!\!CH\!\!=\!\!CH_2$$

wherein k represents an integer of 2 to 8.

4. The method for sealing a non-aqueous electrolyte secondary battery by using a sealing member according to claim 1, wherein the fluorine-containing elastomer further contains tetrafluoroethylene unit, and a content of tetrafluoroethylene unit in the fluorine-containing elastomer is 15 to 60 mol % based on the total monomer units.

5. The method for sealing a non-aqueous electrolyte secondary battery by using a sealing member according to claim 1, wherein the fluorine-containing elastomer further contains vinylidene fluoride unit, and a content of vinylidene fluoride unit in the fluorine-containing elastomer is 35 to 70 mol % based on the total monomer units.

6. The method for sealing a non-aqueous electrolyte secondary battery by using a sealing member according to claim 1, wherein the crosslinkable composition further contains a fluorine-containing elastomer that does not contain any unit based on the crosslinkable group-containing monomer.

7. The method for sealing a non-aqueous electrolyte secondary battery by using a sealing member according to claim 1, wherein the crosslinkable composition further contains a peroxide cross-linking agent.

* * * * *